US008020533B2

(12) United States Patent
Tsuchiya et al.

(10) Patent No.: US 8,020,533 B2
(45) Date of Patent: Sep. 20, 2011

(54) FUEL INJECTION DEVICE, FUEL INJECTION CONTROL DEVICE, AND CONTROL METHOD OF FUEL INJECTION DEVICE

(75) Inventors: Tadao Tsuchiya, Miyagi (JP); Manabu Shouji, Miyagi (JP); Tsukasa Naganuma, Tochigi (JP); Yasuharu Hourai, Tochigi (JP); Kenichi Omori, Saitama (JP); Kazuhito Kakimoto, Saitama (JP); Hidetaka Ozawa, Saitama (JP)

(73) Assignee: Keihin Corporation, Tokyo (JP)

( * ) Notice: Subject to any disclaimer, the term of this patent is extended or adjusted under 35 U.S.C. 154(b) by 868 days.

(21) Appl. No.: 11/802,574

(22) Filed: May 23, 2007

(65) Prior Publication Data

US 2007/0284456 A1 Dec. 13, 2007

(30) Foreign Application Priority Data

May 23, 2006 (JP) ................................ 2006-142369
May 23, 2006 (JP) ................................ 2006-142370

(51) Int. Cl.
*F02M 51/00* (2006.01)
*F16K 31/02* (2006.01)

(52) U.S. Cl. ................ 123/478; 239/585.1; 251/129.09

(58) Field of Classification Search ................. 123/478, 123/479, 490, 472, 476, 480, 492, 494; 239/102.2, 239/88, 535.1, 535.2, 535.3; 251/129.09, 251/129.1, 129.15, 129.26; 335/216
See application file for complete search history.

(56) References Cited

U.S. PATENT DOCUMENTS

| | | | | |
|---|---|---|---|---|
| 6,113,014 | A * | 9/2000 | Coldren et al. | 239/585.1 |
| 6,343,751 | B1 * | 2/2002 | Ito et al. | 239/585.4 |
| 6,364,221 | B1 * | 4/2002 | Czimmek | 239/585.1 |
| 6,796,511 | B2 * | 9/2004 | Hohl | 239/5 |
| 7,665,443 | B2 * | 2/2010 | Pensar et al. | 123/479 |
| 2003/0178510 | A1 * | 9/2003 | Kato et al. | 239/585.1 |

(Continued)

FOREIGN PATENT DOCUMENTS

JP 02-190682 7/1990

(Continued)

OTHER PUBLICATIONS

Japanese Search Report issued in corresponding application on Jul. 22, 2010 (6 pages).

(Continued)

*Primary Examiner* — John Kwon
*Assistant Examiner* — Johnny Hoang
(74) *Attorney, Agent, or Firm* — Kratz, Quintos & Hanson, LLP

(57) ABSTRACT

To provide a fuel injection device for controlling a fuel injection valve including a solenoid and a magnetostrictive element to generate a drive force for driving the fuel injection valve, the fuel injection device including: a solenoid power source (31) for driving the solenoid, a solenoid drive circuit (10) adapted to control the electrification to the solenoid by the solenoid power source (31), a plurality of magnetostrictive element driving power sources (32, 33) for driving the magnetostrictive element, and a magnetostrictive element drive circuit (20) adapted to control the electrification to a magnetostrictive coil of the magnetostrictive element by the magnetostrictive element driving power sources. Since the plurality of the magnetostrictive element driving power sources can be respectively used when performing a valve-opening operation and when performing a valve-closing operation of the fuel injection valve of the fuel injection device, the opening/closing operation of the fuel injection valve of the fuel injection device can be properly performed.

12 Claims, 13 Drawing Sheets

U.S. PATENT DOCUMENTS

2005/0145714 A1* 7/2005 Abe ................................ 239/88

FOREIGN PATENT DOCUMENTS

| | | |
|---|---|---|
| JP | 9-310655 | 12/1997 |
| JP | 2004-316644 | 11/2004 |
| JP | 2005-171854 | 6/2005 |
| JP | 2007-315178 | 12/2007 |
| JP | 2007-315179 | 12/2007 |

OTHER PUBLICATIONS

Japanese Office Action issued for Japanese Patent Application No. 2006-142369 dated Nov. 30, 2010, with English Translation.

Japanese Office Action issued for Japanese Patent Application No. 2006-142370 dated Nov. 30, 2010, with English Translation.

* cited by examiner

FUEL INJECTION DEVICE, FUEL INJECTION CONTROL DEVICE, AND CONTROL METHOD OF FUEL INJECTION DEVICE

CROSS-REFERENCE TO RELATED APPLICATION(S)

This application claims the foreign priority benefit under Title 35, United States Code, §119 (a)-(d), of Japanese Patent Application No. 2006-142369 and Japanese Patent Application No. 2006-142370 filed on May 23, 2006 in the Japan Patent Office, the disclosure of which is herein incorporated by reference in its entirety.

BACKGROUND OF THE INVENTION

1. Field of the Invention

The present invention relates to a fuel injection device, a fuel injection control device, and a control method of the fuel injection device capable of properly performing opening/closing operations of a fuel injection valve including a solenoid and a magnetostrictive element.

2. Description of the Related Art

There has been known a magnet-type fuel injection device used for an internal combustion engine, the fuel injection device including an injector having a fuel injection valve driven by a magnet, a driving power source, and a drive circuit provided between the power source and the injector, the drive circuit supplying a drive current from the power source to the injector when receiving a fuel injection command (an operation signal). A battery is generally used as the driving power source.

In the injector of the magnet-type fuel injection device, when not performing injection, a needle valve is forced to abut an injection hole by a coil spring, and when performing injection, the needle valve is attracted by the magnet to open the injection hole so that the fuel is injected. However, the problem with the injector of the magnet-type fuel injection device is that the fuel injection valve does not open and close sufficiently quick in response to the operation signal. To solve this problem, there is proposed a fuel injection device in which a piezoelectric element (or an electrostrictive element, or a magnetostrictive element) is attached to a portion of the needle of the injector, and the opening/closing operation of the fuel injection valve is adjusted by an elongation operation of the element (refer to Published patent application No. 2004-316644, paragraphs 0005 to 0026, FIG. 2 and others).

However, according to the above patent document, the piezoelectric element is biased through an electric terminal (not shown), and the piezoelectric element is elongated/contracted by the bias. Also, since it is described in the document that the bias to the piezoelectric element is performed with no relationship with the bias of the electromagnetic operation device, the document fails to give any description on what kind of electrical control circuit or control method should be provided to properly perform the opening/closing operation of the fuel injection valve. Further, the document fails to give out a clear relationship between the piezoelectric element operation and the electromagnetic operation when performing the opening/closing operation of the fuel injection valve control.

SUMMARY OF THE INVENTION

In order to solve the aforesaid problems, an object of the present invention is to provide a fuel injection device, a fuel injection control device, and a control method of the fuel injection device capable of properly performing opening/closing operations of a fuel injection valve including a solenoid and a magnetostrictive element.

A fuel injection device according to an aspect of the present invention is for controlling a fuel injection valve including a solenoid and a magnetostrictive element to generate a drive force for driving the fuel injection valve, the fuel injection device including: a solenoid driving power source for supplying current to the solenoid; a solenoid drive circuit adapted to control the current passing through the solenoid, the current being supplied by the solenoid driving power source; a plurality of magnetostrictive element driving power sources for supplying current to a magnetostrictive coil of the magnetostrictive element; and a magnetostrictive element drive circuit adapted to control the current passing through the magnetostrictive coil of the magnetostrictive element, the current being supplied by either one of the magnetostrictive element driving power sources.

It is preferred that the plurality of the magnetostrictive element driving power sources have different output voltages from one another.

It is preferred that the plurality of the magnetostrictive element driving power sources include a first boosting power source and a second boosting power source both being boosted from a predetermined voltage, the later having a higher output voltage than the former.

A fuel injection device according to another aspect of the present invention is for controlling a fuel injection valve which employs a solenoid and a magnetostrictive element to generate a drive force for driving its valve system, the fuel injection device including: a solenoid driving power source for driving the solenoid; a solenoid drive circuit adapted to control the current passing through the solenoid, the current being supplied by the solenoid driving power source; a first magnetostrictive element driving power source boosted from a predetermined voltage to drive the magnetostrictive element; a second magnetostrictive element driving power source boosted from the predetermined voltage to drive the magnetostrictive element; a magnetostrictive element drive circuit adapted to control the current passing through a magnetostrictive coil of the magnetostrictive element, the current being supplied by either the first magnetostrictive element driving power source or the second magnetostrictive element driving power source; and a controller which transmits a command to control the solenoid drive circuit and the magnetostrictive element drive circuit.

It is preferred that the controller transmits an ON command to the magnetostrictive element drive circuit to turn on the first magnetostrictive element driving power source when opening the fuel injection valve, and transmits an ON command to the magnetostrictive element drive circuit to turn on the second magnetostrictive element driving power source when closing the fuel injection valve.

A fuel injection control device according to further another aspect of the present invention includes: a plurality of magnetostrictive element driving power sources for supplying current to a magnetostrictive coil of a magnetostrictive element; and a magnetostrictive element drive circuit adapted to control the current passing through the magnetostrictive coil, the current being supplied by either one of the magnetostrictive element driving power sources.

It is preferred that the fuel injection control device further includes: a solenoid driving power source for supplying current to a solenoid coil; and a solenoid drive circuit adapted to control the current passing through the solenoid coil, the current being supplied by the solenoid driving power source, in which when the current passes through the solenoid coil, the magnetostrictive element drive circuit controls the current passing through the magnetostrictive coil.

A control method of a fuel injection device according to further another aspect of the present invention is for controlling a fuel injection valve including a solenoid and a magnetostrictive element to generate a drive force for driving the fuel injection valve, the control method including: electrifying a solenoid coil for driving the solenoid, and electrifying a magnetostrictive coil of the magnetostrictive element with either one of a plurality of magnetostrictive element driving power sources (for example, a first boosting power source 32, a second boosting power source 33 and a 12V power source 34) for driving the magnetostrictive element.

It is preferred that the solenoid and the magnetostrictive element have substantially the same displacement.

It is preferred that the control method of a fuel injection device further includes a first step for, when the fuel injection valve is in a valve-closed state, electrifying both the solenoid coil and the magnetostrictive coil to hold the fuel injection valve to a first state.

It is preferred that the control method of a fuel injection device further includes a step for, when in the first state, bringing the fuel injection valve into a valve-open state by cutting off the current passing through the magnetostrictive coil.

It is preferred that the control method of a fuel injection device further includes a valve-closing step for, when in the valve-open state, electrifying the magnetostrictive coil to close the fuel injection valve.

It is preferred that either a first power source (for example, the first boosting power source 32) which outputs a first voltage boosted from a predetermined voltage or a second power source (for example, the second boosting power source 33) which outputs a second voltage boosted from a predetermined voltage is used as the plurality of magnetostrictive element driving power sources, the second voltage being higher than the first voltage.

It is preferred that the first step further includes a step for electrifying the solenoid coil and electrifying, with the first power source, the magnetostrictive coil.

It is preferred that the valve-closing step further includes a step for electrifying the magnetostrictive coil with the second power source to close the fuel injection valve.

DETAILED DESCRIPTION OF THE INVENTION

Preferred embodiments of the present invention will be described below with reference to attached drawings.

First Embodiment

Figure 2:
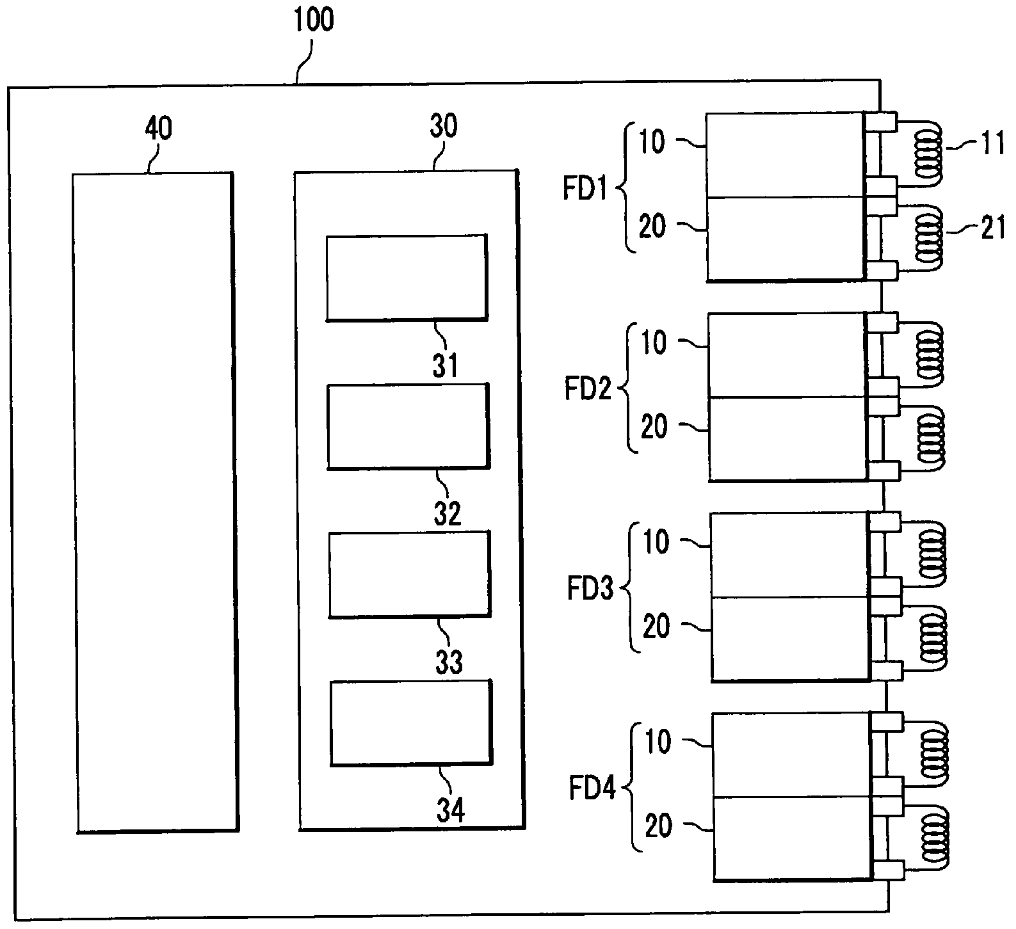
FIG. 2 is a block diagram showing a fuel injection valve control unit of the fuel injection device according to the first embodiment of the present invention.

A fuel injection device according to the present invention includes an injector 200 and a fuel injection valve control unit 100 (see FIG. 2).

Figure 1:
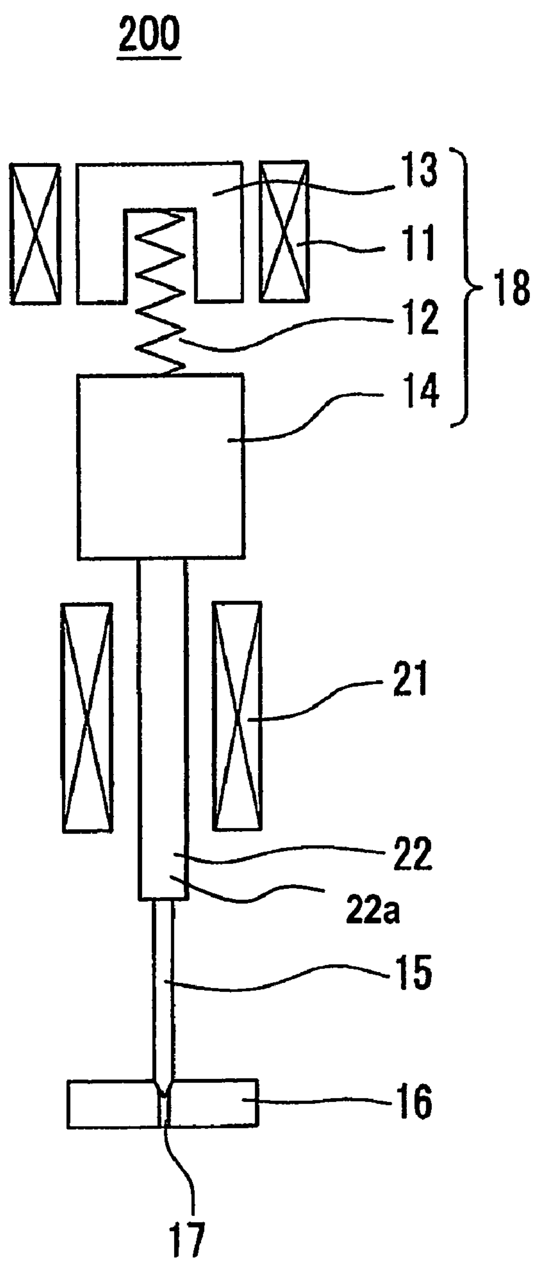
FIG. 1 conceptually shows a constitution of an injector of a fuel injection device according to a first embodiment of the present invention.

FIG. 1 conceptually shows a constitution of the injector of the fuel injection device according to a first embodiment of the present invention. The injector 200 includes a solenoid 18, a cylindrical valve 22 comprising a magnetostrictive element 22*a*, a magnetostrictive coil 21 provided for the valve 22, a valve needle 15 connected to the lower portion of the valve 22, a seat 16, and an injection hole 17 formed on the seat 16. The solenoid 18 includes an armature 14 which is a conductive solid, a fixing core 13 for attracting the armature 14 with an electromagnetic attraction force, a return spring 12 for biasing the fixing core 13 and the armature 14, and a holding coil 11 for providing the electromagnetic attraction force to the fixing core 13. Incidentally, a fuel injection path, an outer casing of the injector and the like are not shown in the drawings. Note that the shape of the valve 22 does not have to be limited to the cylindrical but can be other. For example, the valve 22 can be hollowed.

The solenoid 18 is a device for transforming the electrical energy to a mechanical linear motion. When the holding coil 11 is electrified, the armature 14 is electromagnetically attracted; and when the electrification is stopped, the armature 14 is returned to its original state.

The armature 14 is connected to one end of the valve 22, and the valve needle 15 is connected to the other end of the valve 22, and all these components are enabled to vertically move along the central axis of the drawing. Due to the Joule effect, the length of the magnetostrictive element of the valve 22 changes along the central axis of the drawing owing to an external magnetic field caused by the magnetostrictive coil 21.

When the injector 200 is in a valve-closed state, the tip end of the valve needle 15 opposite the valve 22 is brought in press-contact with the injection hole 17 of the seat 16. When the injector 200 is in a valve-open state, the tip end of the valve needle 15 opposite to the valve 22 comes off the seat 16, so that the fuel is jetted from the injection hole 17.

The holding coil 11 and the magnetostrictive coil 21 are respectively connected to a solenoid drive circuit 10 and a magnetostrictive element drive circuit 20 (see FIG. 2), so that a voltage from a driving power source 30 (see FIG. 2) can be applied.

FIG. 2 is a block diagram showing the fuel injection valve control unit of the fuel injection device according to the first embodiment of the present invention. Herein the fuel injection valve control unit 100 is for a four cylinders engine. The fuel injection valve control unit 100 includes a drive circuit FD1, a drive circuit FD2, a drive circuit FD3, a drive circuit FD4, the driving power source 30, and a controller 40. Incidentally, the holding coil 11 and the magnetostrictive coil 21 are provided in the injector 200, and are shown in the drawing to facilitate the description.

The drive circuit FD1 includes the solenoid drive circuit 10 and the magnetostrictive element drive circuit 20. The drive circuit FD2, the drive circuit FD3, and the drive circuit FD4 have the same configuration as the drive circuit FD1. The solenoid drive circuit 10 applies a voltage to the holding coil 11 in accordance with a command signal output from the controller 40. The magnetostrictive element drive circuit 20 applies a voltage to the magnetostrictive coil 21 in accordance with a command signal from the controller 40.

The driving power source 30 includes a solenoid power source 31, a first boosting power source 32 which outputs a first voltage for the magnetostrictive element, a second boosting power source 33 which outputs a second voltage for the magnetostrictive element, and a 12V power source 34 which is a battery power source. The first voltage and the second voltage are both boosted from a predetermined voltage output by either a battery power source or a magnet-type generator. For example, the first boosting power source 32 is a 40V power source, and the second boosting power source 33 is a 150V power source.

The controller 40 controls the driving power source 30 and controls the valve opening/closing command of the drive circuits FD1 to FD4 for opening/closing the fuel injection valve. Though not shown in the drawings, the controller 40 is realized by a microprocessor, a program stored in a nonvolatile memory (not shown), or the like.

Figure 3:
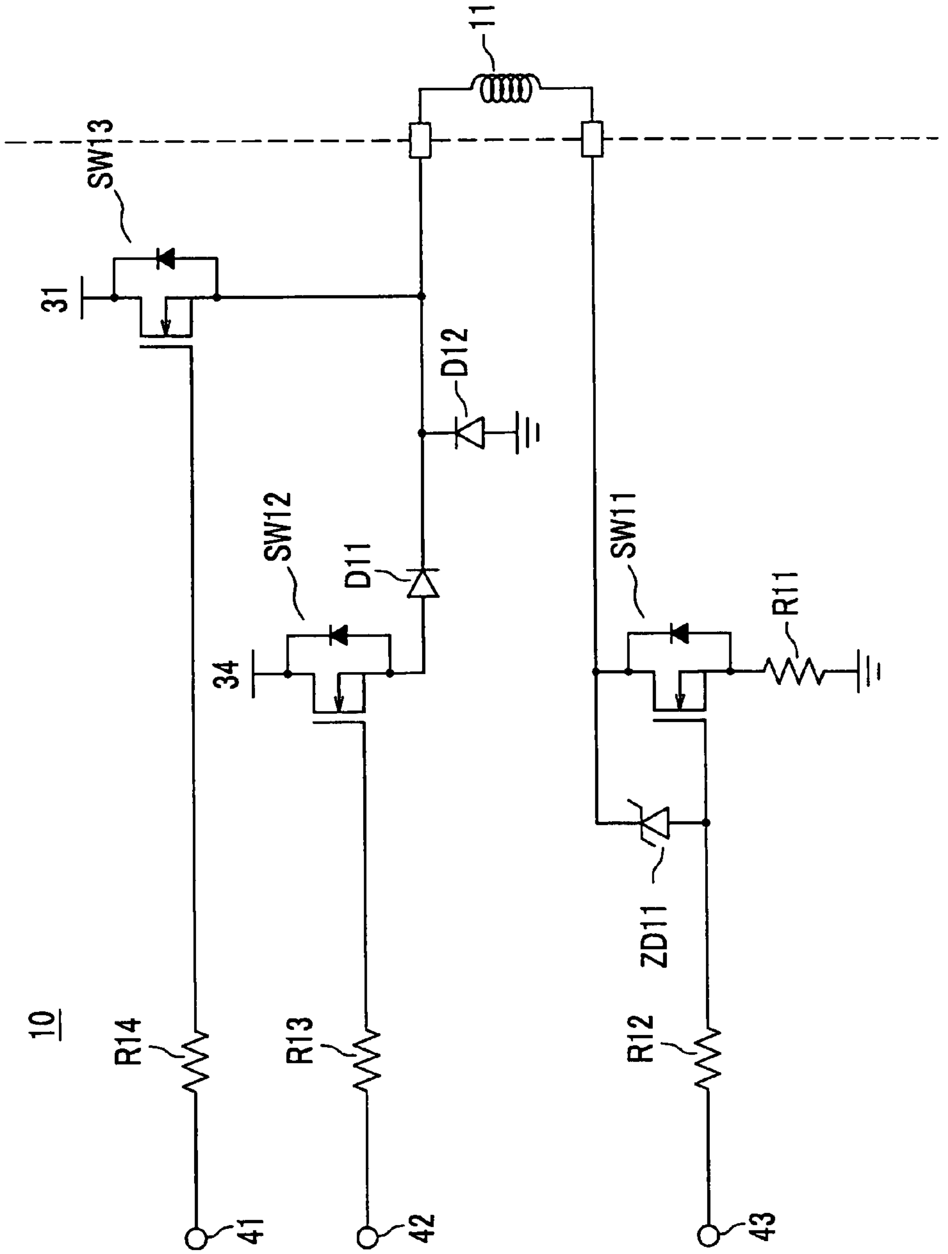
FIG. 3 is a circuit diagram showing a solenoid drive circuit.

FIG. 3 is a circuit diagram showing the solenoid drive circuit. The solenoid drive circuit 10 is a switch circuit for controlling the electrification of the holding coil 11 of the injector 200. As shown in FIG. 3, a switch SW11, a switch SW12, and a switch SW13 each are a switching element such as a FET.

Incidentally, the switch SW11, the switch SW12, and the switch SW13 also can each be a bipolar transistor, an IGBT (Insulated Gate Bipolar Transistor) or the like, as long as they have switching function.

A drain of the switch SW13 is connected to the solenoid power source 31, and a source of the switch SW13 is connected to one end of the holding coil 11. Agate of the switch SW13 is connected to a high-voltage HI driver terminal 41 through a protective resistor R14.

A drain of the switch SW12 is connected to the 12V power source 34, and a source of the switch SW12 is connected to the one end of the holding coil 11 through a diode D11. A gate of the switch SW12 is connected to a low-voltage HI driver terminal 42 through a protective resistor R13.

A drain of the switch SW11 is connected to the other end of the holding coil 11, and a source of the switch SW11 is grounded through a resistor R11. A zener diode ZD11 is connected between the drain and a gate of the switch SW11. The gate of the switch SW11 is connected to a LO driver terminal 43 through a protective resistor R12. Incidentally, a cathode of a diode D12, which serves as a commutation diode, is connected to the one end of the holding coil 11.

The high-voltage HI driver terminal 41, the low-voltage HI driver terminal 42 and the LO driver terminal 43 are connected to the controller 40.

To electrify the holding coil 11, an ON command signal is provided from the controller 40 to either the high-voltage HI driver terminal 41 or the low-voltage HI driver terminal 42, and to the LO driver terminal 43.

Figure 4:
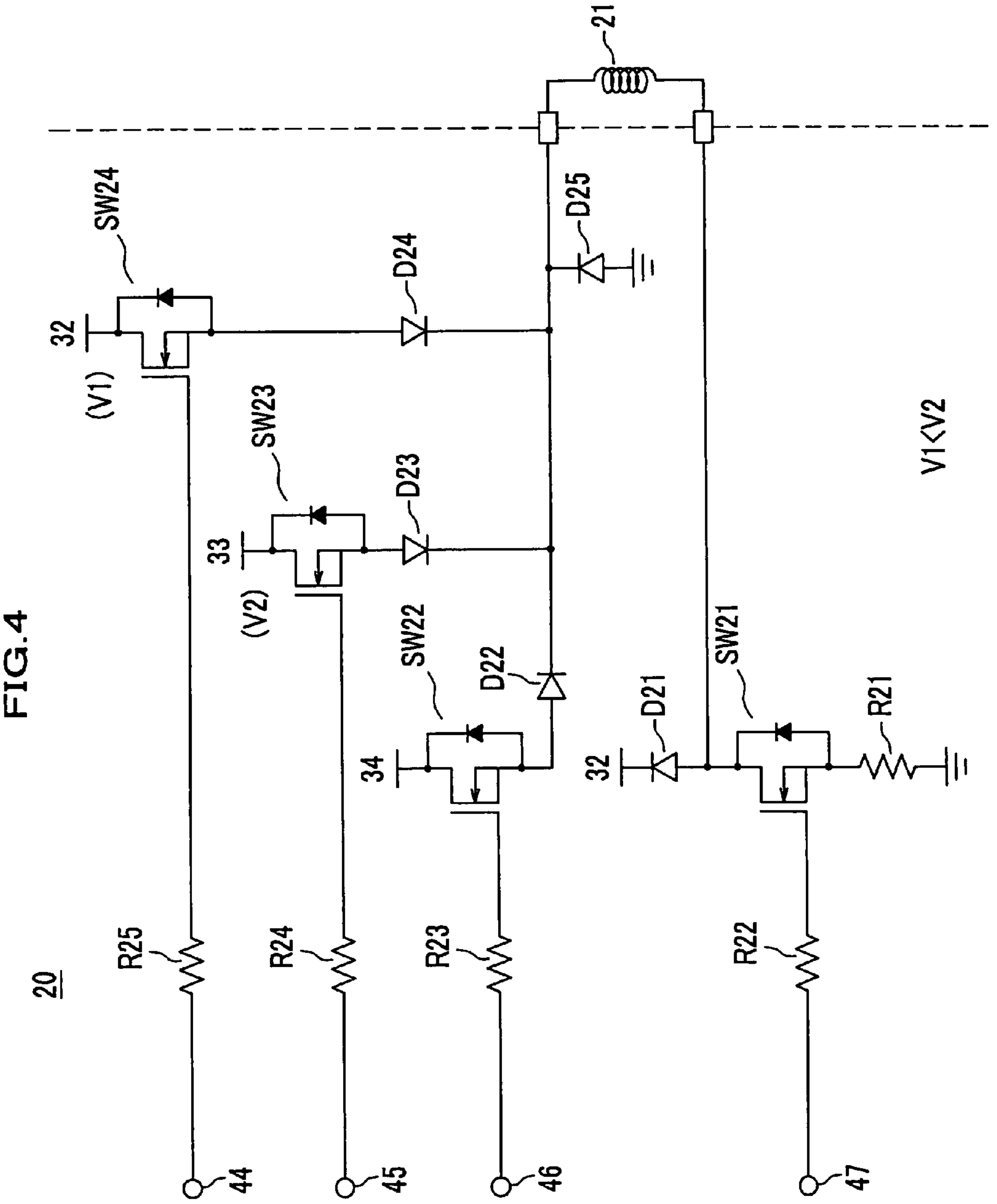
FIG. 4 is a circuit diagram showing a magnetostrictive element drive circuit.

FIG. 4 is a circuit diagram showing the magnetostrictive element drive circuit 20. The magnetostrictive element drive circuit 20 is a switch circuit for controlling the electrification of the magnetostrictive coil 21 of the injector 200. As shown in FIG. 4, a switch SW21, a switch SW22, a switch SW23 and a switch SW24 are each a switching element such as a FET.

Incidentally, the switch SW21, the switch SW22, the switch SW23 and the switch SW24 also can each be a bipolar transistor, an IGBT or the like, as long as they have switching function.

A drain of the switch SW24 is connected to the first boosting power source 32, and a source of the switch SW24 is connected to one end of the magnetostrictive coil 21 through a diode D24. A gate of the switch SW24 is connected to a boosting open driver terminal 44 through a protective resistor R25.

A drain of the switch SW23 is connected to the second boosting power source 33, and a source of the switch SW23 is connected to the one end of the magnetostrictive coil 21 through a diode D23. A gate of the switch SW23 is connected to a boosting close driver terminal 45 through a protective resistor R24.

A drain of the switch SW22 is connected to the 12V power source 34, and a source of the switch SW22 is connected to the one end of the magnetostrictive coil 21 through a diode D22. A gate of the switch SW22 is connected to a 12V system driver terminal 46 through a protective resistor R23. Incidentally, a cathode of a diode D25, which serves as a commutation diode, is connected to the one end of the magnetostrictive coil 21.

A drain of the switch SW21 is connected to the other end of the magnetostrictive coil 21. The drain of the switch SW21 is also connected to either the first boosting power source 32 or the second boosting power source 33 through a diode D21. A source of the switch SW21 is grounded through resistor R21. A gate of the switch SW21 is connected to a low side driver terminal 47 through a protective resistor R22.

The boosting open driver terminal 44, the boosting close driver terminal 45, the 12V system driver terminal 46 and the low side driver terminal 47 are connected to the controller 40.

To electrify the magnetostrictive coil 21, an ON command signal is provided from the controller 40 to any one of the boosting open driver terminal 44, the boosting close driver terminal 45 and the 12V system driver terminal 46, and to the low side driver terminal 47.

The operation will be described as below.

Figure 5:
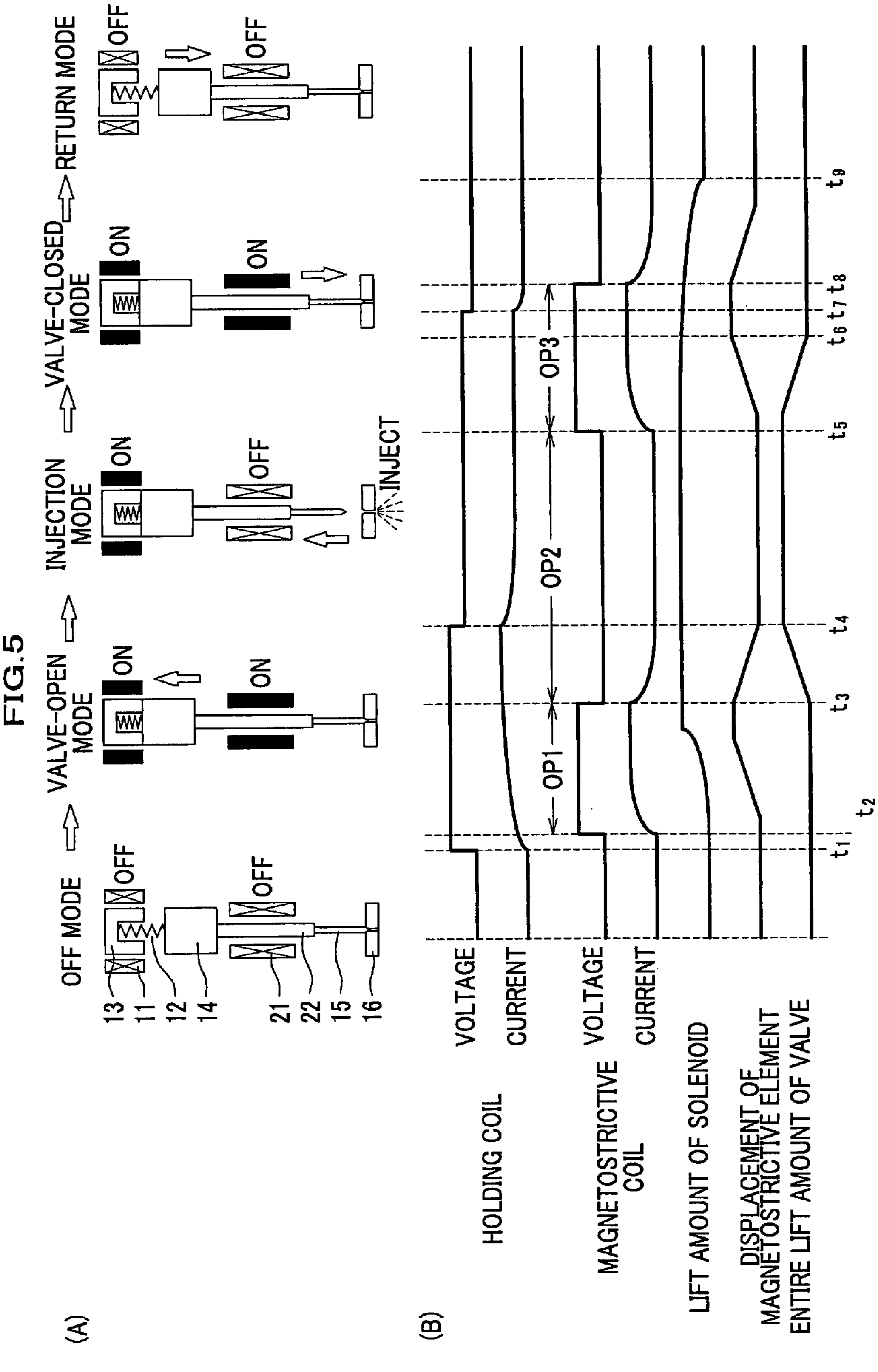
FIG. 5 is an illustration explaining the principle of the operation of the fuel injection device according to the first embodiment of the present invention.

FIG. 5 is an illustration explaining the principle of the operation of the fuel injection device according to the first embodiment of the present invention. As shown in FIG. 5 (A), the basic valve opening/closing operation of the injector 200 includes an OFF mode, a valve-open mode, an injection mode, a valve-closed mode and a return mode. The term "mode" herein is used to indicate the state of the opening/closing operation of the valve. FIG. 5 (B) shows voltage and current waveforms of the holding coil 11, voltage and current waveforms of the magnetostrictive coil 21, a lift amount of the solenoid, a displacement of the magnetostrictive element, and an entire lift amount of the valve 22 for each mode. The abscissa is time t. The displacement of the magnetostrictive element is an elongation of the magnetostrictive element caused in accordance with the magnetic field applied to the magnetostrictive element. The displacement of the magnetostrictive element becomes zero when applied magnetic field is zero, and increases (elongates) when applied magnetic field increases.

When in the OFF mode ($t<t_1$), the holding coil 11 and the magnetostrictive coil 21 are not electrified, thus the injector stays in the valve-closed state.

When in the valve-open mode, the voltages are respectively applied to the holding coil 11 and the magnetostrictive coil 21, and the injector is in a state to be opened. At time $t_1$, the voltage is applied to the holding coil 11, so that an electrification current passes through the holding coil 11. The solenoid begins to lift as the electrification current is increased. At time $t_2$, the voltage is applied to the magnetostrictive coil 21, so that an electrification current passes through the magnetostrictive coil 21. The current linearly increases with the inductance of the magnetostrictive coil 21 as a gradient. On the other hand, since the permeability is nonlinear, it increases gradually. As the electrification current increases, the magnetostrictive element elongates, and the displacement of the magnetostrictive element increases. At time $t_3$, the armature 14 of the solenoid is attracted to the holding coil 11 and is held in this position. The magnetostrictive element elongates due to the magnetic field caused by the electrification current, thus the displacement of the magnetostrictive element becomes large. Since the lift amount of the solenoid and the displacement of the magnetostrictive element offset with each other, the entire lift amount of the valve becomes zero, and therefore the injector is in the valve-closed state. Incidentally, although FIG. 5 shows a case in which applying the voltage to the holding coil 11 is started before applying the voltage to the magnetostrictive coil 21, the case also can be such one in which applying the voltage to the holding coil 11 is started after applying the voltage to the magnetostrictive coil 21.

When in the injection mode, the voltage applied to the magnetostrictive coil 21 is cut off, and the injector is in the valve-open state. At time $t_3$, the voltage applied to the magnetostrictive coil 21 is cut off, so that the electrification current passing through the magnetostrictive coil 21 decreases, and the displacement of the magnetostrictive element decreases, which brings the injector 200 into the valve-open state. At time $t_4$, the entire lift amount of the valve 22 becomes the maximum, and the injector 200 is in the valve-open state.

When in the valve-closed mode, the voltage is applied to the magnetostrictive coil 21, and the injector is in the valve-closed state. At time $t_5$, the voltage is applied to the magnetostrictive coil 21, so that electrification current passes through the magnetostrictive coil 21. As the electrification current increases, the magnetostrictive element elongates, and the displacement of the magnetostrictive element increases. The entire lift amount of the valve becomes small. At time $t_6$, the injector is in the valve-closed state, and injection of the fuel is stopped.

When in the return mode, the voltages applied to both the holding coil 11 and the magnetostrictive coil 21 are cut off, the solenoid is returned to its original state, and the displacement of the magnetostrictive element is returned to its original state. At time $t_7$, the voltage applied to the holding coil 11 is cut off. Thus, the electrification current passing through the holding coil 11 decreases, and owing to the return force of the return spring 12, the lift amount of the solenoid decreases. At time $t_8$, the voltage applied to the magnetostrictive coil 21 is cut off, so that the electrification current passing through the magnetostrictive coil 21 decreases, and the displacement of the magnetostrictive element decreases. At time $t_9$, the lift amount of the solenoid becomes zero, and the injector 200 is brought into the OFF mode.

Figure 13:
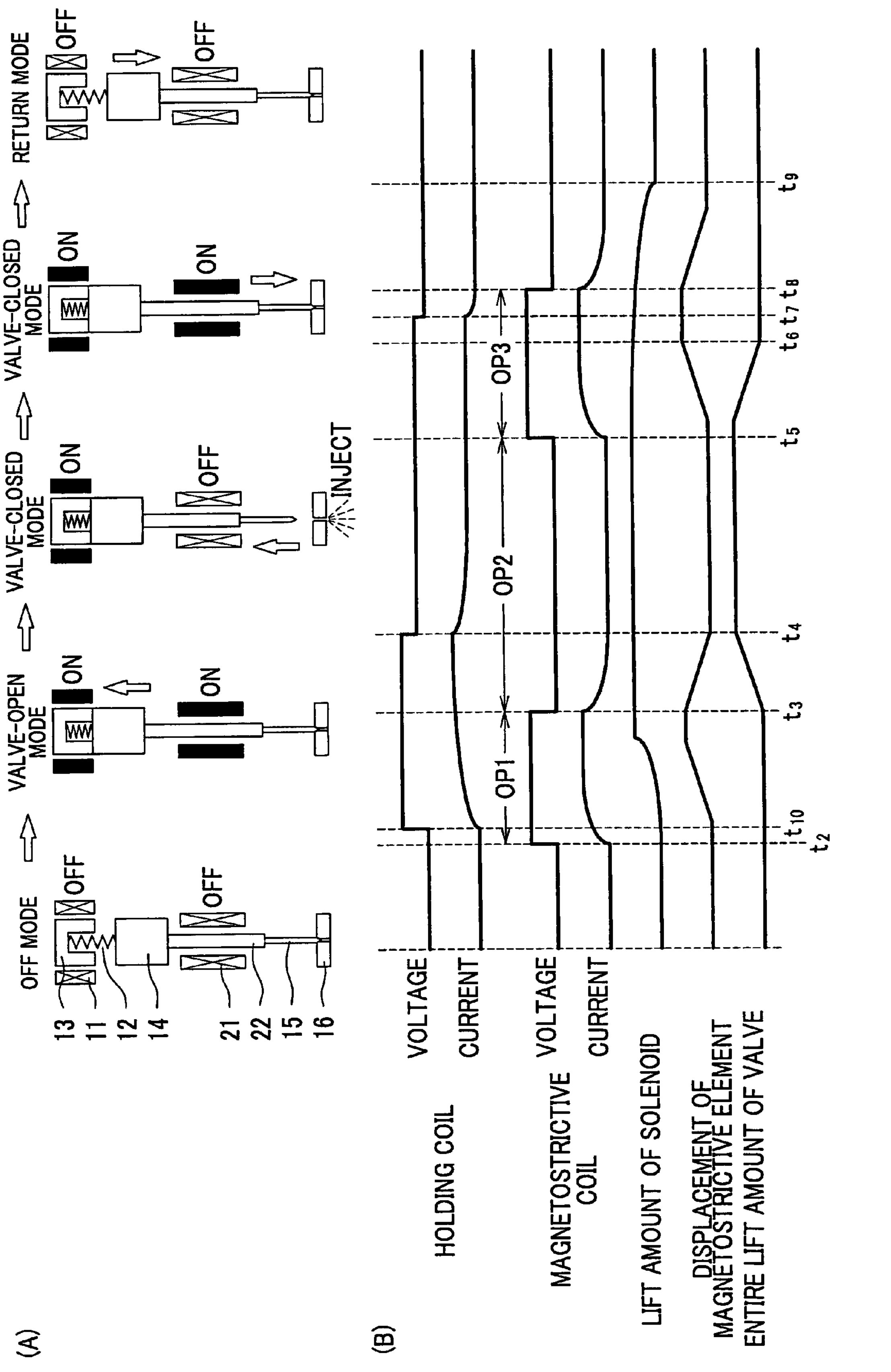
FIG. 13 is an illustration explaining the principle of the operation of the fuel injection device in another valve-open mode according to the first embodiment of the present invention.

FIG. 13 is an illustration explaining the principle of the operation of the fuel injection device in another valve-open mode according to the first embodiment of the present invention. FIG. 13 differs from FIG. 5 in that it has different operation in the valve-open mode. Since the OFF mode, the injection mode, the valve-closed mode and the valve-open mode are identical to those of FIG. 5, the description thereof is omitted. When in the valve-open mode shown in FIG. 13, at time $t_2$, the voltage is first applied to the magnetostrictive coil 21. Thus, the magnetostrictive coil 21 is electrified, and the electrification current passes through the magnetostrictive coil 21. The current linearly increases with an inductance of the magnetostrictive coil 21 as a gradient. On the other hand, since the permeability is nonlinear, it increases gradually. As the electrification current increases, the magnetostrictive element elongates, and the displacement of the magnetostrictive element increases. At time $t_{10}$, the voltage is applied to the holding coil 11. Thus, the electrification current passes through the holding coil 11. As the electrification current increase, the solenoid begins to lift. At time $t_3$, the armature 14 of the solenoid 18 is attracted to the holding coil 11 and is held in this position. The magnetostrictive element elongates owing to the magnetic field generated by the electrification current, thus the displacement of the magnetostrictive element becomes large. Since the lift amount of the solenoid and the displacement of the magnetostrictive element offset with each other, the entire lift amount of the valve becomes zero, and therefore the injector is in the valve-closed state. As shown in FIG. 13, in the valve-open mode, electrifying the holding coil 11 by applying a voltage thereto can be started after electrifying the magnetostrictive coil 21 by applying a voltage thereto.

To facilitate the description of the operation of the drive circuits shown in FIGS. 6 to 9, the period from time $t_2$ to time $t_3$ in FIG. 5 is referred to as operation OP1, the period from time $t_3$ to time $t_5$ is referred to as operation OP2, and the period from time $t_5$ to time $t_8$ is referred to as operation OP3.

Figure 6:
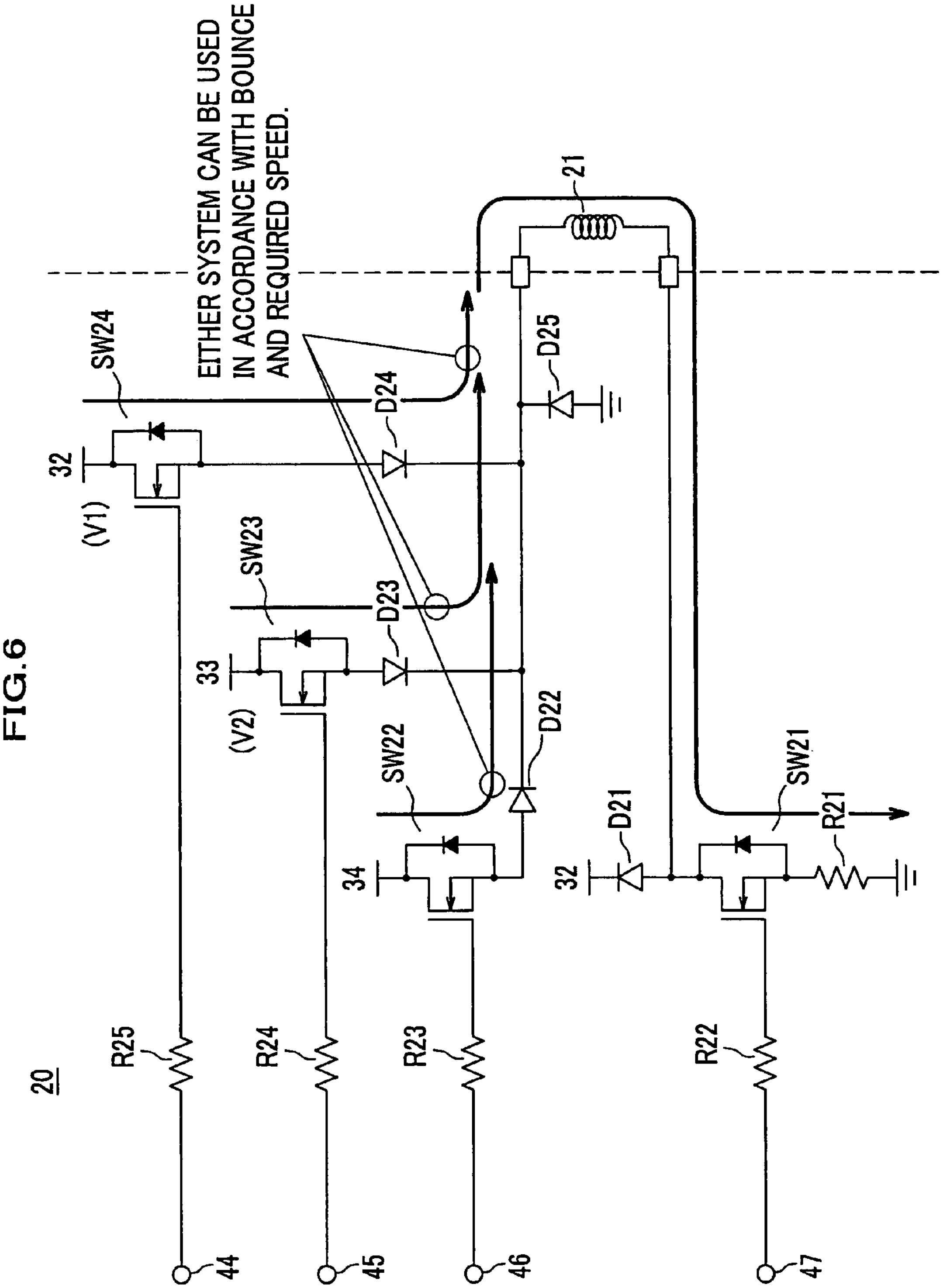
FIG. 6 is an illustration explaining how elongation of a magnetostrictive element is controlled when in a valve-open mode.

FIG. 6 is an illustration explaining how the elongation of the magnetostrictive element is controlled when in the valve-open mode. In the operation OP1, in order to elongate the magnetostrictive element, the voltage needs to be applied to the magnetostrictive coil 21 to generate the electrification current. The power sources to electrify to the magnetostrictive coil 21 include the first boosting power source 32, the second boosting power source 33 and the 12V power source 34.

In order to apply the voltage to the magnetostrictive coil 21, the voltage of the first boosting power source 32 is applied to the magnetostrictive coil 21 by switching on the switch SW24 with an ON command signal from the boosting open driver terminal 44; or the voltage of the second boosting power source 33 can be applied to the magnetostrictive coil 21 by switching on the switch SW23 with an ON command signal from the boosting close driver terminal 45; or the voltage of the 12V power source 34 can be applied to the magnetostrictive coil 21 by switching on the switch SW22 with an ON command signal from the 12V system driver terminal 46. When applying the voltage to the magnetostrictive coil 21, the electrification current passes through the magnetostrictive coil 21 by switching on the switch SW21 with an ON command signal from the low side driver terminal 47. Incidentally, it is preferred that the first boosting power source 32, the second boosting power source 33 and the 12V power source 34 are controlled in accordance with the request specification of the speed of the elongation operation of the magnetostrictive element and the request specification of the bounce measure of the valve.

In general, the higher the voltage applied to the magnetostrictive coil 21 is, the quicker the response of the magnetostrictive element becomes. Thus, for example, the second voltage (150V in this embodiment) which has the highest voltage can be first used as a driving voltage so that magnetostrictive element is quickly displaced to a desired displacement, and then the driving voltage can be switched to a voltage (the first voltage or the 12V voltage, for example) which is high enough to maintain the desired displacement. Thus, it is possible to allow the fuel injection valve to operate quickly with reduced power consumption.

Figure 7:
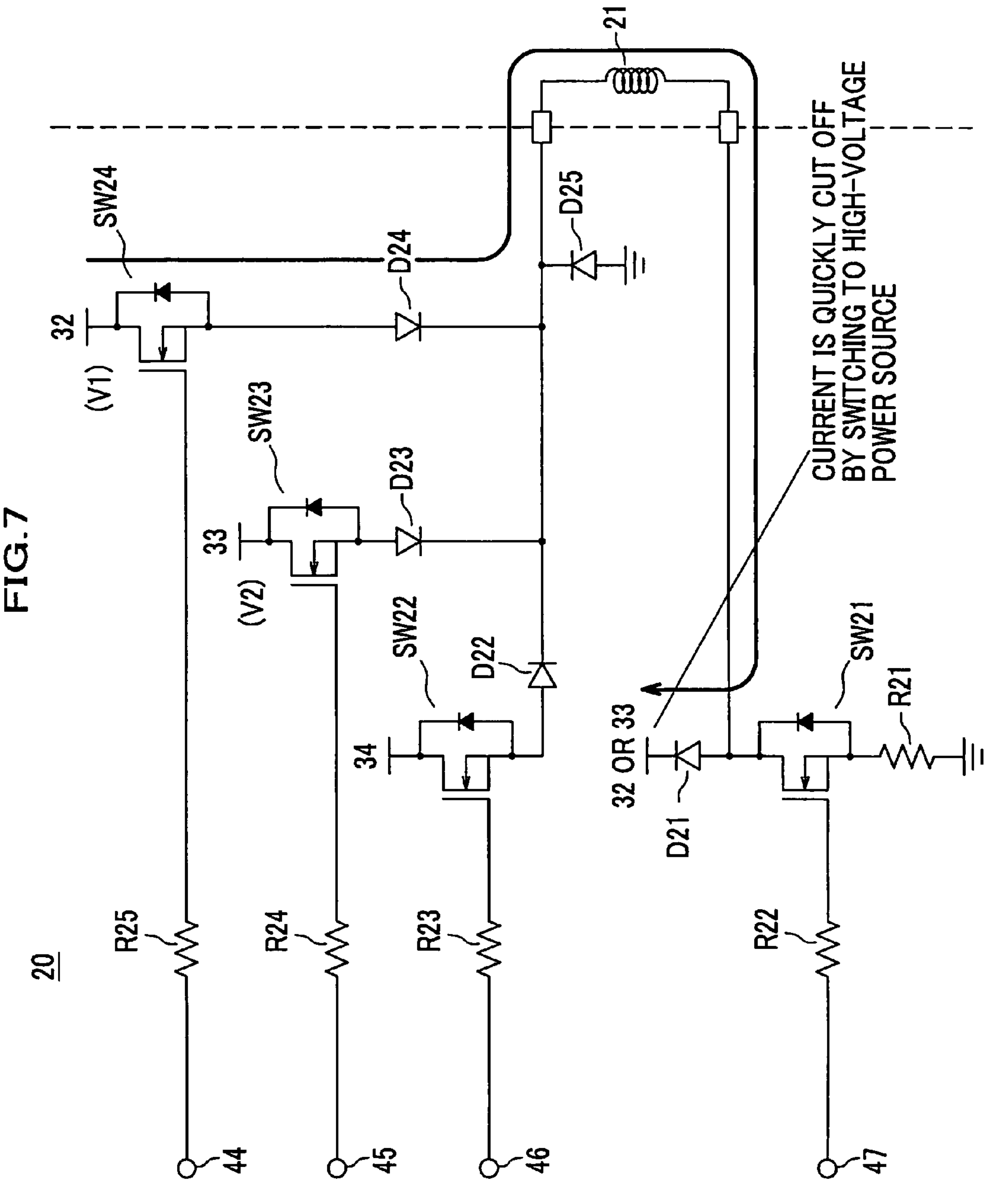
FIG. 7 is an illustration explaining how contraction of the magnetostrictive element is controlled when in an injection mode.

FIG. 7 is an illustration explaining how contraction of the magnetostrictive element is controlled when in the injection mode. In the operation OP2, in order to shorten the length of the magnetostrictive element, the voltage applied to the magnetostrictive coil 21 needs to be cut off so as to cut off the electrification current. The following describes how the electrification current passing through the magnetostrictive coil 21 is cut off from the first boosting power source 32 when the switch SW24 is in the ON state. The switch SW24 is cut off according to an OFF command signal from the boosting open driver terminal 44. Since the electrification current passing through the magnetostrictive coil 21 continues to flow instead to immediately reducing to zero after the time when the voltage applied is cut off, the switch SW21 is cut off according to an OFF command signal from the low side driver terminal 47 when the voltage applied to the magnetostrictive coil 21 is cut off. Since the electrification current passing through the resistor R21 is turned to the diode D21 side, the electrification current can be quickly reduced so as to be cut off.

Similarly, in order to cut off the electrification current passing through the magnetostrictive coil 21 from the second boosting power source 33, the electrification current passing through the magnetostrictive coil 21 can be cut off by switching off the switch SW23 and the switch SW21.

Figure 8:
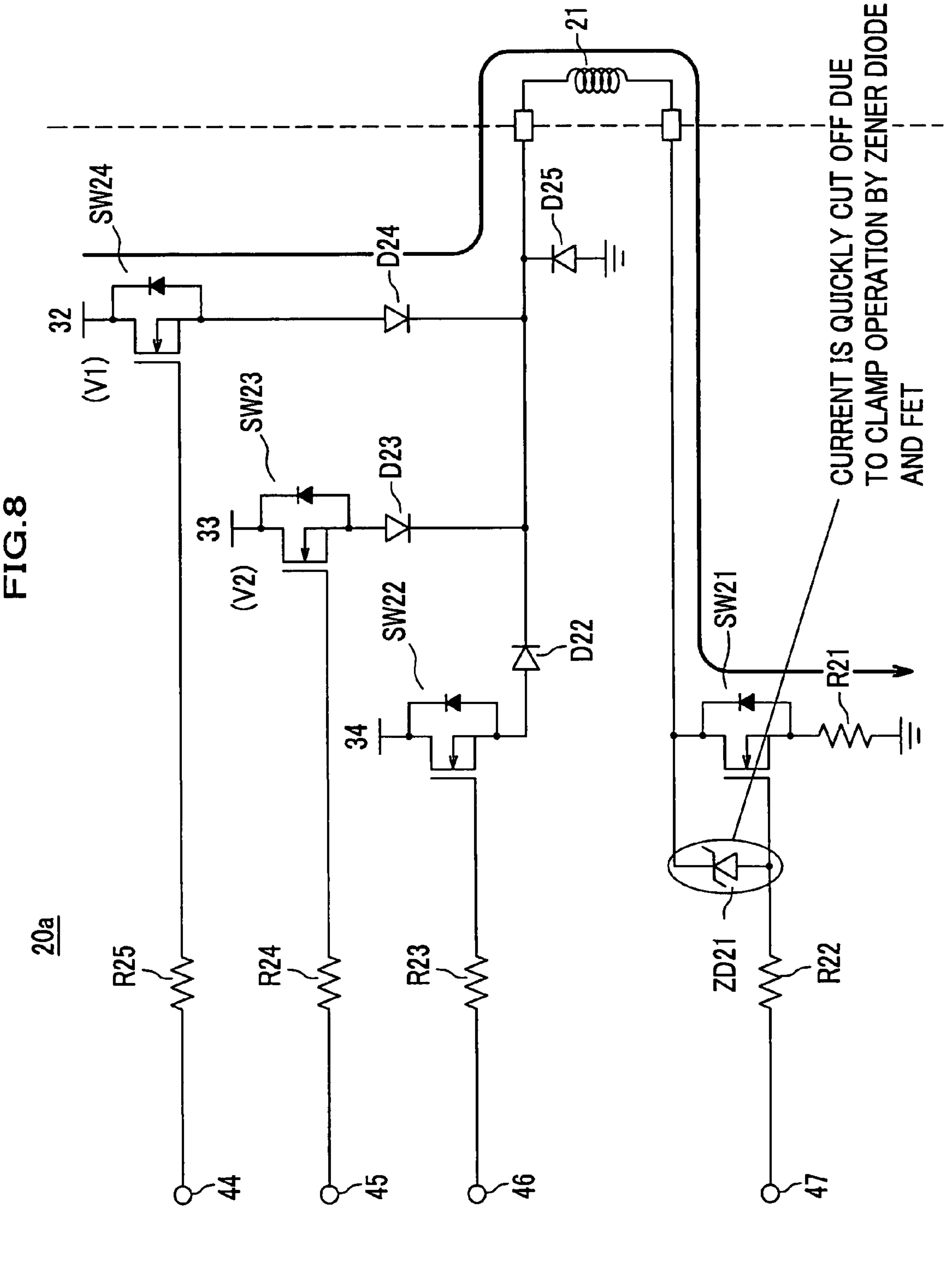
FIG. 8 is a circuit diagram showing the magnetostrictive element drive circuit according to another embodiment.

FIG. 8 is a circuit diagram showing the magnetostrictive element drive circuit according to another embodiment. In the operation OP2, in order to shorten the length of the magnetostrictive element, the voltage applied to the magnetostrictive coil 21 needs to be cut off so as to cut off the electrification current. The configuration and the operation of another circuit for cutting off the electrification current passing through the magnetostrictive coil 21 will be described as below.

The magnetostrictive element drive circuit **20*a* shown in FIG. 8 differs from the magnetostrictive element drive circuit 20 shown in FIG. 4 in that the diode D21 is eliminated, and a zener diode ZD21 is added between the gate and the drain of the switch SW21. The switch SW24 and the switch SW21 are switched off in order to cut off the electrification current passing through the magnetostrictive coil 21 from the first boosting power source 32 when the switch SW24 is in the ON state. Thus, the current passing through the magnetostrictive coil 21 can be quickly cut off due to the clamp operation by the zener diode ZD21** and the FET.

Figure 9:
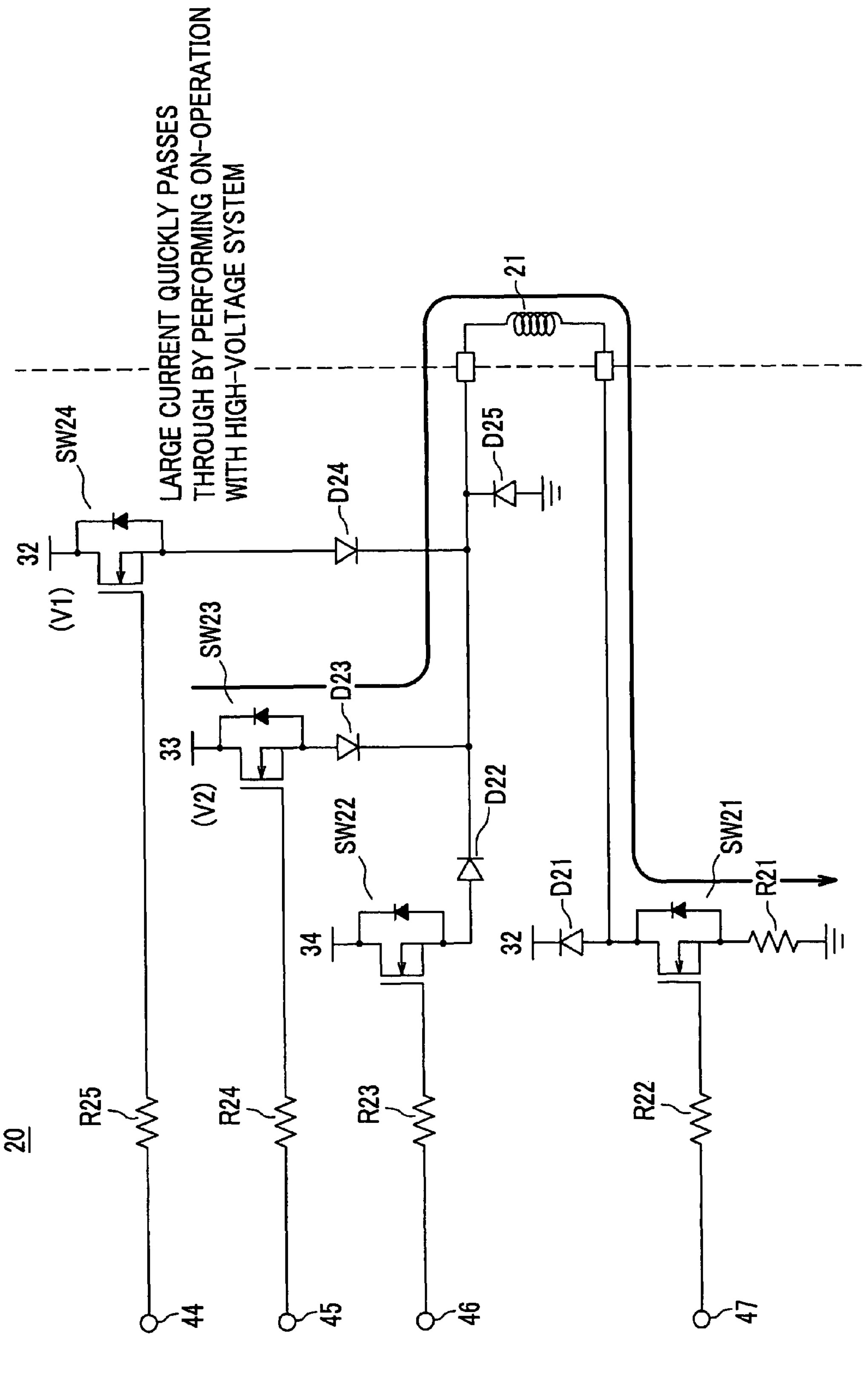
FIG. 9 is an illustration explaining how the elongation of the magnetostrictive element is controlled when in a valve-closed mode.

FIG. 9 is an illustration explaining how the elongation of the magnetostrictive element is controlled when in the valve-closed mode. In the operation OP2, in order to increase the length of the magnetostrictive element, a voltage needs to be applied to the magnetostrictive coil 21 to produce an electrification current. Further, in the valve-closed mode, it may be required to close the valve within a short time. In order to close the valve within a short time, the second boosting power source 33 is set to a higher voltage than the first boosting power source 32, so that a large current quickly passes through the magnetostrictive coil 21. The large current from the second boosting power source 33 can pass through the magnetostrictive coil 21 by switching on the switch SW23 and the switch SW21.

Figure 10:
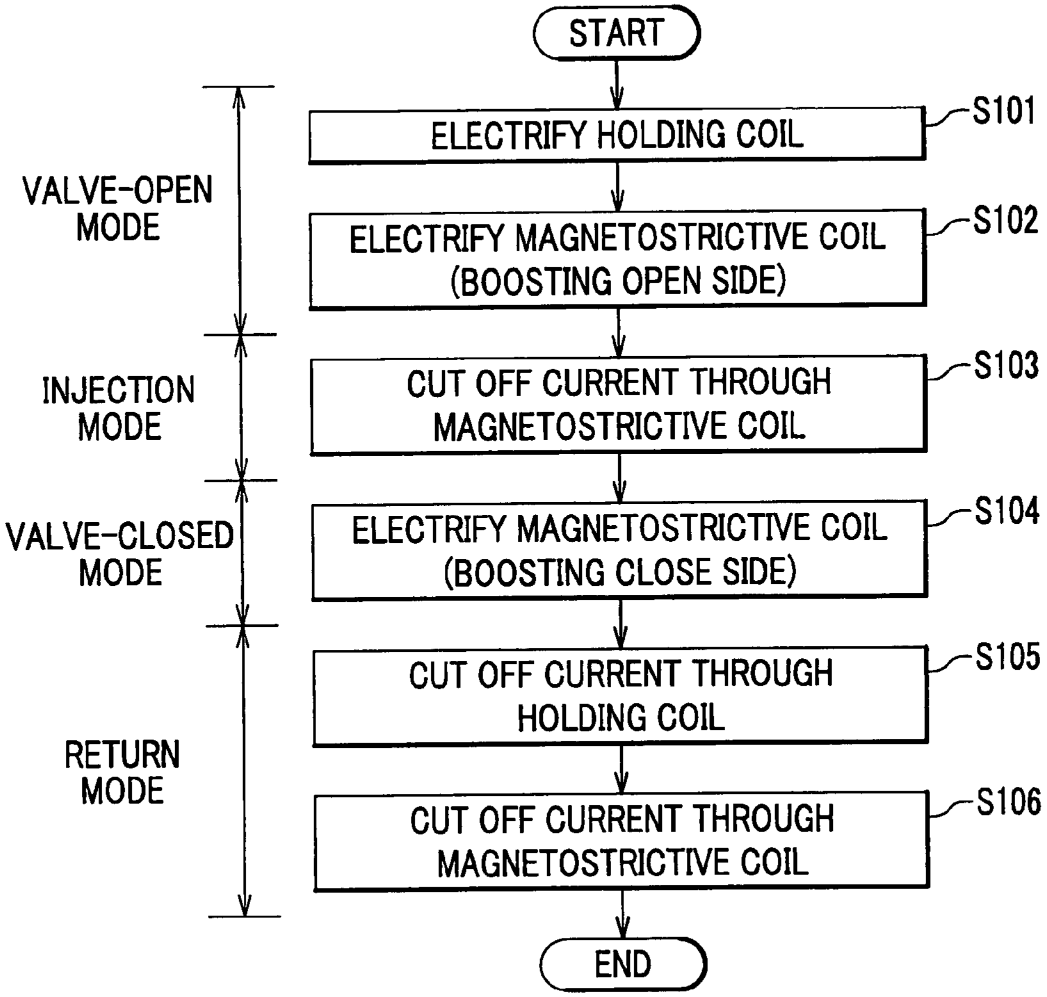
FIG. 10 is a flowchart showing the operation of a controller in FIG. 2.

FIG. 10 is a flowchart showing the operation of the controller in FIG. 2. As shown in FIG. 10, in the valve-open mode, the holding coil 11 is electrified by the solenoid power source 31 (step S101), and the magnetostrictive coil 21 is electrified by first boosting power source 32 (step S102). The electrification timing of the step S101 and the step S102 can be the same or one after the other so that a tip end of the valve needle 15 dose not come off the seat 16. Further, the bounce of the solenoid when lifting can be reduced by electrifying the magnetostrictive coil 21 in the step S 102.

In the injection mode, the current passing through the magnetostrictive coil 21 is cut off (step S103). In order to obtain a quick response to open the valve, it is preferred to quickly cut off the electrification current.

In the valve-closed mode, the magnetostrictive coil 21 is electrified by the second boosting power source 33 (step S104). It is preferred that the boosting power source of the second boosting power source 33 is set higher than that of the first boosting power source 32. Thus, a large current can pass through the magnetostrictive coil 21, so that the valve can be closed at high speed.

By employing a plurality of power source voltages (such as the first boosting power source 32, the second boosting power source 33 and the like), it becomes possible to electrify the magnetostrictive coil 21 with respective voltages when in the valve-open mode and when in the valve-closed mode. Thus, the period for using high voltage can be shortened, and capacitor charge time of the high-voltage power circuit can be shortened, so that the valve can be opened/closed at high speed.

In the return mode, the current passing through the holding coil 11 is cut off (step S105), and the current passing through the magnetostrictive coil 21 is cut off (step S106).

Figure 11:
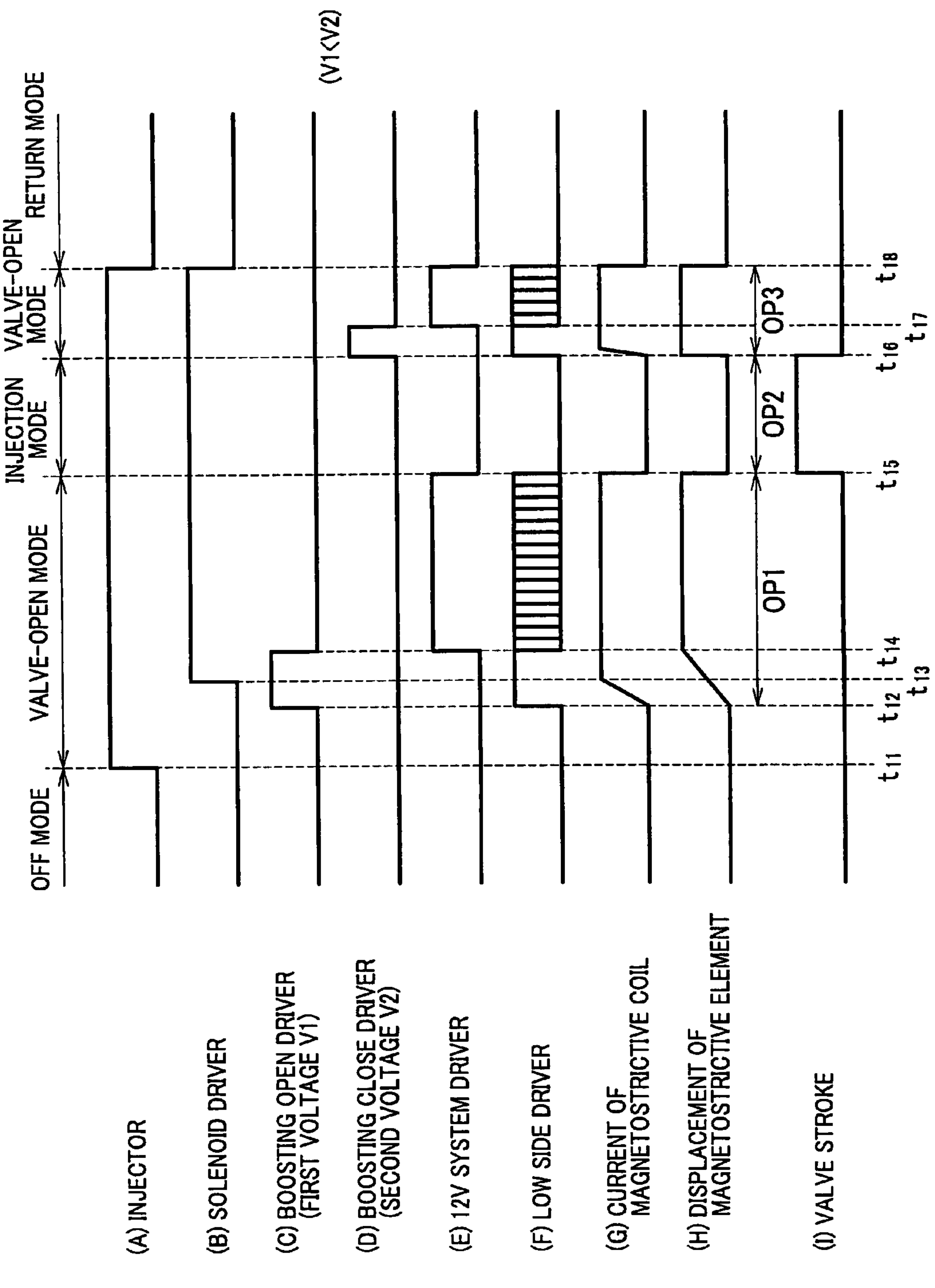
FIG. 11 is a timing chart showing a method for controlling a fuel injection valve according to the first embodiment of the present invention.

FIG. 11 is a timing chart showing a method for controlling the fuel injection valve according to the first embodiment of the present invention. FIG. 11 shows waveforms of the control signals for respective portions (A) to (F), a waveform of the current passing through the magnetostrictive coil (G), a waveform of the displacement of the magnetostrictive element (H), and a waveform of valve stroke (I). The operation for opening/closing the valve according to the command signals from the controller 40 will be described as below for each mode shown in FIG. 5.

In the valve-open mode, at time $t_{11}$, the controller 40 receives an ON command signal from a superordinate controller (such as an integral controller of an engine) for turning on the injector 1 (corresponding to the drive circuit FD1). Note that, although the ON command signal for turning on the injector 1 is received from the superordinate controller herein, the ON command signal for turning on the injector 1 also can be output from the controller 40.

At time $t_{12}$, the controller 40 outputs ON command signals to the boosting open driver terminal 44 and the low side driver terminal 47. The magnetostrictive coil 21 is electrified, and the magnetostrictive element begins to be displaced. At time $t_{13}$, the controller 40 outputs an ON command signal to the solenoid driver.

At time $t_{14}$, the controller 40 outputs an ON command signal to the 12V system driver terminal 46, and outputs an OFF command signal to the boosting open driver terminal 44. Herein, the power source applied to the magnetostrictive coil 21 is switched from the first boosting power source 32 to the 12V power source 34. Since the displacement of the magnetostrictive element has already become large at this point, the electrification current is reduced in order to reduce the heating caused by the magnetostrictive coil 21.

In the period from time $t_{14}$ to time $t_{15}$, the controller 40 outputs a PWM ON/OFF signal to the low side driver terminal 47. Thus, the electrification current passing through the magnetostrictive coil 21 is turned ON/OFF, so that heating caused by an excessive electrification current is reduced.

In the injection mode, at time $t_{15}$, the controller 40 outputs OFF command signals to both the 12V system driver terminal 46 and the low side driver terminal 47. The electrification current passing through the magnetostrictive coil 21 is cut off, the magnetostrictive element is contracted, and the displacement of the magnetostrictive element is returned to the initial state as in the OFF mode. Thus, the valve stroke of the valve 22 is in the valve-open state. The injection amount of the fuel is determined according to an opening/closing degree, an opening/closing time of the valve and the like. In the present embodiment, since the valve opening operation by contracting the magnetostrictive element can be performed at a high speed, the injection amount can be precisely controlled.

In the valve-closed mode, at time $t_{16}$, the controller 40 outputs ON command signals to the boosting close driver terminal 45 and the low side driver terminal 47. The current from the second boosting power source 33 passes through the magnetostrictive coil 21. Since the second boosting power source 33 is a boosting power source having higher voltage than the first boosting power source 32, the displacement of the magnetostrictive element increases quickly. Since the displacement of the magnetostrictive element increases, the injector turn to the valve-closed state. The injection amount of the fuel is determined according to the opening/closing degree, opening/closing time of the valve and the like. In the present embodiment, since the valve closing operation by extending the magnetostrictive element can be performed at high speed, the injection amount can be precisely controlled.

At time $t_{17}$, the controller 40 outputs an ON command signal to the 12V system driver terminal 46 and outputs an OFF command signal to the boosting close driver terminal 45. Herein, the power source applied to the magnetostrictive coil 21 is switched from the second boosting power source 33 to the 12V power source 34. Since the displacement of the magnetostrictive element has already become large at this point, the electrification current is reduced in order to reduce the heating caused by the magnetostrictive coil 21.

In the period from time $t_{17}$ to time 18, the controller 40 outputs a PWM ON/OFF signal to the low side driver terminal 47. Thus, the electrification current passing through the magnetostrictive coil 21 is switched ON/OFF, so that heating caused by an excessive electrification current is reduced.

At time $t_{18}$, the controller 40 receives an ON command signal from a superordinate controller (such as an integral controller of an engine) for turning on the injector 1 (corresponding to the drive circuit FD1).

By the above operation, the controller 40 is brought into the return mode, and outputs OFF command signals respectively to the solenoid driver, the boosting close driver terminal 45 and the low side driver terminal 47 at time $t_{18}$. The solenoid is returned to its original state, the electrification current passing through the magnetostrictive coil 21 is cut off, and the displacement of the magnetostrictive element is returned to the initial state as in the OFF mode.

In the present embodiment, a plurality of boosting power sources (the first boosting power source 32 and the second boosting power source 33) different with one another are used to electrify the magnetostrictive coil 21 respectively for the valve-open mode and for the valve-closed mode. Thus, the value of the electrification current can be changed, and the elongation time of the magnetostrictive element can be controlled.

Further, even in the case where repetition period of electrifying the magnetostrictive coil 21 is short (for example, in the case where the period between time $t_{12}$ and time $t_{16}$ is short), the electrification can be performed respectively with the plurality of the boosting power sources. With respect to the present embodiment, however, considering the boosting time, it will be difficult to obtain a voltage high enough yet having long duration time, if the same electrification method is performed with a single boosting power source.

Second Embodiment

Figure 12:
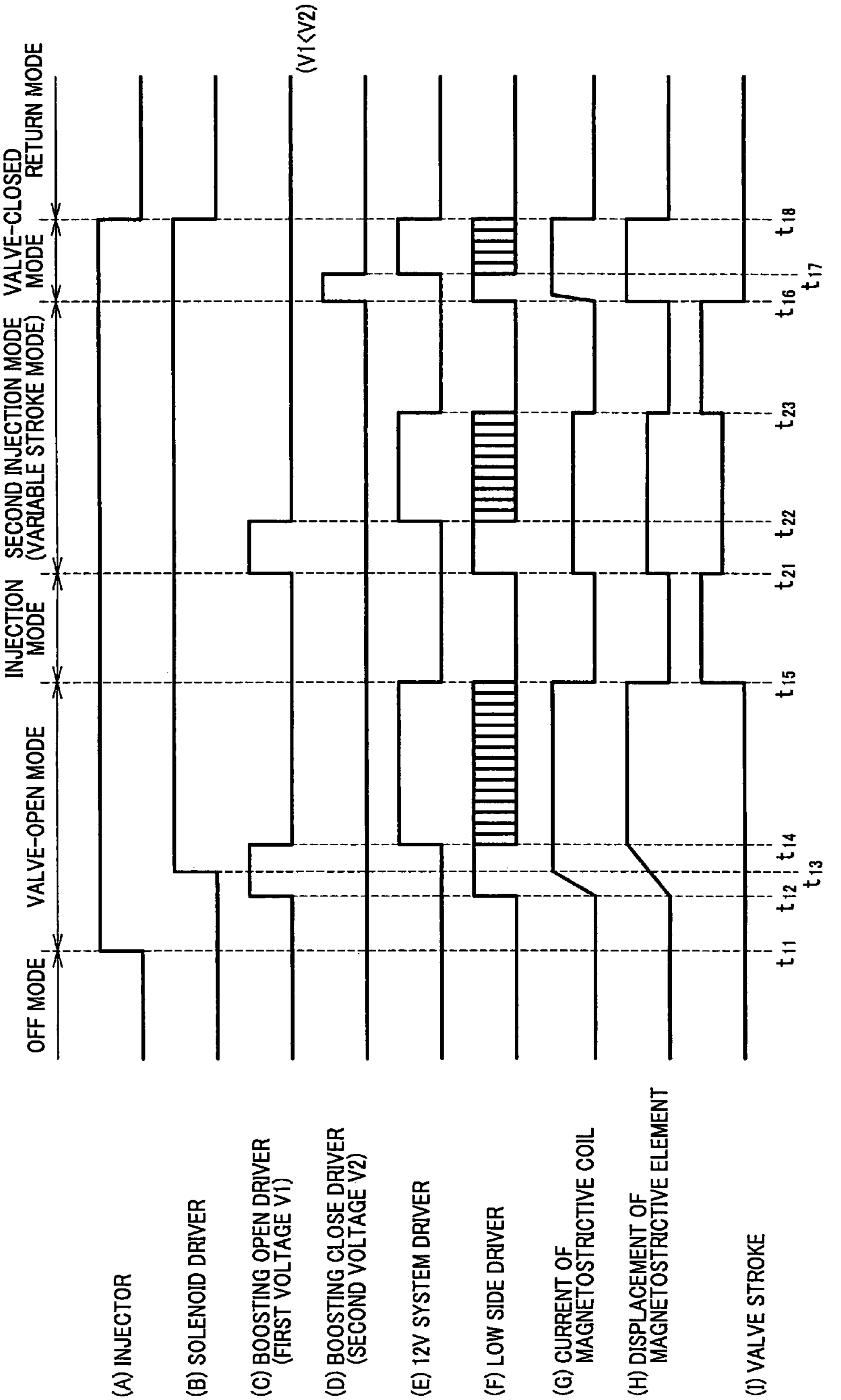
FIG. 12 is a timing chart showing a method for controlling the fuel injection valve according to a second embodiment of the present invention.

FIG. 12 is a timing chart showing a method for controlling the fuel injection valve according to a second embodiment of the present invention. FIG. 12 shows waveforms of the control signals for respective portions (A) to (F), a waveform of the current passing through the magnetostrictive coil (G), a waveform of the displacement of the magnetostrictive element (H), and a waveform of valve stroke (I). Compared with the waveform diagram shown in FIG. 11, a second injection mode is added in the waveform diagram shown in FIG. 12. The second injection mode is a variable stroke mode which makes the valve stroke variable in order to adjust the injection amount of the fuel in the injection mode. Since the OFF mode, the valve-open mode, the injection mode, the valve-closed mode and the return mode are identical to those of FIG. 11, the description thereof will be omitted.

In the second injection mode, at time $t_{21}$, the controller 40 outputs ON command signals to both the boosting open driver terminal 44 and the low side driver terminal 47. The magnetostrictive coil 21 begins to be electrified, and the magnetostrictive element begins to be displaced.

At time $t_{22}$, the controller 40 outputs an ON command signal to the 12V system driver terminal 46 and outputs an OFF command signal to the boosting open driver terminal 44. Herein, the power source applied to the magnetostrictive coil 21 is switched from the first boosting power source 32 to the 12V power source 34. Since the displacement of the magnetostrictive element has already become large at this point, the electrification current is reduced in order to reduce the heating caused by the magnetostrictive coil 21.

In the period from time $t_{22}$ to time $t_{23}$, the controller 40 outputs a PWM ON/OFF signal to the low side driver terminal 47. Thus, the electrification current passing through the magnetostrictive coil 21 is switched ON/OFF, so that heating caused by the electrification current is reduced.

In the period from time $t_{21}$ to time $t_{23}$, the valve stroke is changed by changing the displacement of the magnetostrictive element.

At time $t_{23}$, the controller 40 outputs OFF command signals to both the 12V system driver terminal 46 and the low side driver terminal 47. Thus, the valve stroke is returned to the state as in the injection mode.

In the present embodiment, the injection amount of the fuel can be adjusted owing to the variable stroke mode. This is because that the displacement of the magnetostrictive element caused by electrifying the magnetostrictive coil 21 can be adjusted. In the variable stroke mode, not only the first boosting power source 32 can be used as the power source as described by FIG. 11, but also the second boosting power source 33 or the 12V power source 34 can be used the power source, as long as the current corresponding to the resistance of the magnetostrictive coil 21 can be produced and the magnetostrictive element can be extended linearly. Further, in the variable stroke mode, the power source can be discriminatingly used by taking into account the power source capacities of the first boosting power source 32, the second boosting power source 33 and the 12V power source 34.

In the aforesaid embodiments, the driving power source 30 includes the solenoid power source 31, the first boosting power source 32, the second boosting power source 33 and the 12V power source 34. However, the driving power source of the fuel injection valve control unit 100 does not have to be limited thereto, but can have any configuration as long as a voltage for the solenoid, a first voltage and a second voltage for the magnetostrictive coil can be output based on the voltage supplied by the battery, as well as a 12V voltage adjusted to a suitable specification can be produced. Also, in order to facilitate the description, the control signals for controlling the switching elements of the drive circuits are output from the controller 40 through the respective terminals in the above description, these terminals is not indispensable.

What is claimed is:

1. A fuel injection device for controlling a fuel injection valve including a solenoid and a magnetostrictive element that elongates when a magnetic field is applied thereto to generate a drive force for driving the fuel injection valve, the fuel injection device comprising:

a solenoid driving power source for supplying current to the solenoid, wherein the solenoid includes a holding coil for providing electromagnetic attraction force;

a solenoid drive circuit adapted to control the current passing through the solenoid, the current being supplied by the solenoid driving power source;

a plurality of magnetostrictive element driving power sources for supplying current to a magnetostrictive coil of the magnetostrictive element, wherein the plurality of magnetostrictive element driving power sources includes at least a first magnetostrictive element driving power source and a second magnetostrictive element driving power source, wherein a boosting power source of the second magnetostrictive element driving power source is set higher than a boosting power source of the first magnetostrictive element driving power source; and a magnetostrictive element drive circuit adapted to control the current passing through the magnetostrictive coil of the magnetostrictive element, the current being supplied by either one of the magnetostrictive element driving power sources;

wherein, in a valve-open mode, the holding coil is electrified by the solenoid driving power source and the magnetostrictive coil is electrified by the first magnetostrictive element driving power source;

wherein, in a valve-closed mode, the magnetostrictive coil is electrified by the second magnetostrictive element driving power source.

2. The fuel injection device according to claim 1, wherein the plurality of the magnetostrictive element driving power sources have different output voltages from one another.

3. The fuel injection device according to claim 1, wherein the plurality of the magnetostrictive element driving power sources include a first boosting power source and a second boosting power source both being boosted from a predetermined voltage, the later having a higher output voltage than the former.

4. A fuel injection device for controlling a fuel injection valve which employs a solenoid and a magnetostrictive element that elongates when a magnetic field is applied thereto to generate a drive force for driving its valve system, the fuel injection device comprising:

a solenoid driving power source for driving the solenoid, wherein the solenoid includes a holding coil for providing electromagnetic attraction force;

a solenoid drive circuit adapted to control the current passing through the solenoid, the current being supplied by the solenoid driving power source;

a first magnetostrictive element driving power source boosted from a predetermined voltage to drive the magnetostrictive element;

a second magnetostrictive element driving power source boosted from the predetermined voltage to drive the magnetostrictive element, wherein a boosting power source of the second magnetostrictive element driving power source is set higher than a boosting power source of the first magnetostrictive element driving power source;

a magnetostrictive element drive circuit adapted to control the current passing through a magnetostrictive coil of the magnetostrictive element, the current being supplied by either the first magnetostrictive element driving power source or the second magnetostrictive element driving power source; and a controller which transmits a command to control the solenoid drive circuit and the magnetostrictive element drive circuit, wherein, in a valve-open mode, the holding coil is electrified by the solenoid driving power source and the magnetostrictive coil is electrified by the first magnetostrictive element driving power source;

wherein, in a valve-closed mode, the magnetostrictive coil is electrified by the second magnetostrictive element driving power source.

5. The fuel injection device according to claim 4, wherein the controller transmits an ON command to the magnetostrictive element drive circuit to turn on the first magnetostrictive element driving power source when opening the fuel injection valve, and transmits an ON command to the magnetostrictive element drive circuit to turn on the second magnetostrictive element driving power source when closing the fuel injection valve.

6. A fuel injection control device comprising:

a solenoid driving power source for supplying current to a solenoid coil;

a plurality of magnetostrictive element driving power sources for supplying current to a magnetostrictive coil of a magnetostrictive element that elongates when a magnetic field is applied thereto, wherein the plurality of magnetostrictive element driving power sources includes at least a first magnetostrictive element driving power source and a second magnetostrictive element driving power source, wherein a boosting power source of the second magnetostrictive element driving power source is set higher than a boosting power source of the first magnetostrictive element driving power source; and a magnetostrictive element drive circuit adapted to control the current passing through the magnetostrictive coil, the current being supplied by either one of the magnetostrictive element driving power sources, wherein, in a valve-open mode, the solenoid coil is electrified by the solenoid driving power source and the magnetostrictive coil is electrified by the first magnetostrictive element driving power source;

wherein, in a valve-closed mode, the magnetostrictive coil is electrified by the second magnetostrictive element driving power source.

7. The fuel injection control device according to claim 6, further comprising:

a solenoid drive circuit adapted to control the current passing through the solenoid coil, the current being supplied by the solenoid driving power source, wherein when the current passes through the solenoid coil, the magnetostrictive element drive circuit controls the current passing through the magnetostrictive coil.

8. A control method of a fuel injection device for controlling a fuel injection valve including a solenoid and a magnetostrictive element that elongates when a magnetic field is applied thereto to generate a drive force for driving the fuel injection valve, the control method comprising:

electrifying a solenoid coil by a solenoid driving power source for driving the solenoid, and electrifying a magnetostrictive coil of the magnetostrictive element with either one of a plurality of magnetostrictive element driving power sources for driving the magnetostrictive element, wherein the plurality of magnetostrictive element driving power sources includes at least a first magnetostrictive element driving power source and a second magnetostrictive element driving power source, wherein a boosting power source of the second magnetostrictive element driving power source is set higher than a boosting power source of the first magnetostrictive element driving power source, wherein, in a valve-open mode, the solenoid coil is electrified by the solenoid driving power source and the magnetostrictive coil is electrified by the first magnetostrictive element driving power source, wherein, in a valve-closed mode, the magnetostrictive coil is electrified by the second magnetostrictive element driving power source.

9. The control method of a fuel injection device according to claim 8, wherein the solenoid and the magnetostrictive element have substantially the same displacement.

10. The control method of a fuel injection device according to claim 9, further comprising:

a first step for, when the fuel injection valve is in a valve-closed state, electrifying both the solenoid coil and the magnetostrictive coil to hold the fuel injection valve to a first state.

11. The control method of a fuel injection device according to claim 10, further comprising:

a step for, when in the first state, bringing the fuel injection valve into a valve-open state by cutting off the current passing through the magnetostrictive coil.

12. The control method of a fuel injection device according to claim 11, further comprising:

a valve-closing step for, when in the valve-open state, electrifying the magnetostrictive coil to close the fuel injection valve.

* * * * *